W. O. CHASE.
DEVICE FOR PREVENTING LIQUID FROM FREEZING IN TANKS.
APPLICATION FILED JAN. 29, 1912.
1,061,525.
Patented May 13, 1913.
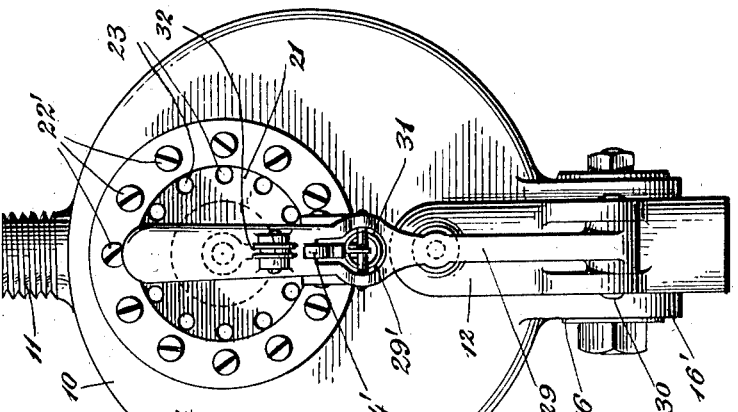
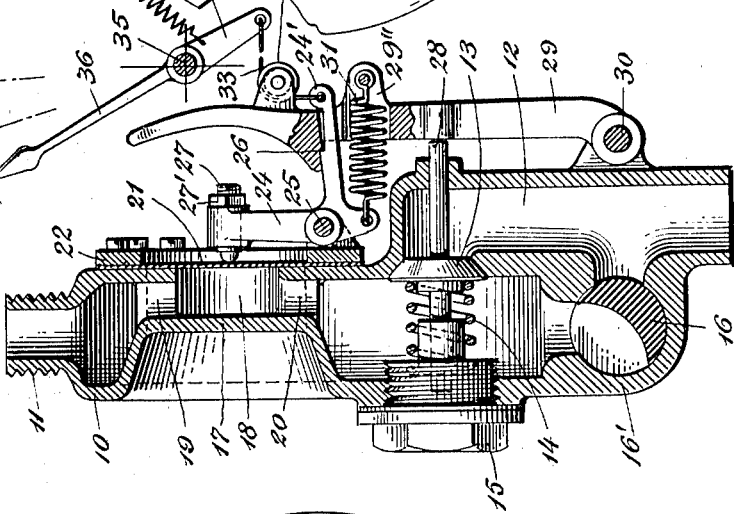
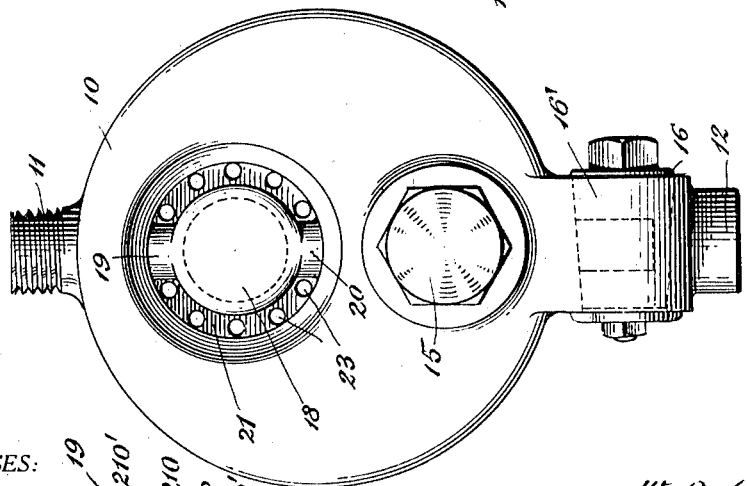
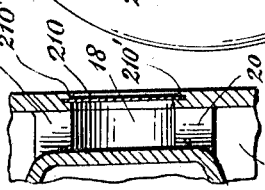
WITNESSES:
INVENTOR.
W. O. Chase
BY Chas. F. Schmelz
ATTORNEY.

UNITED STATES PATENT OFFICE.

WILFRED O. CHASE, OF DETROIT, MICHIGAN.

DEVICE FOR PREVENTING LIQUID FROM FREEZING IN TANKS.

1,061,525.  Specification of Letters Patent.  Patented May 13, 1913.

Application filed January 29, 1912. Serial No. 674,183.

*To all whom it may concern:*

Be it known that I, WILFRED O. CHASE, a citizen of the United States, residing at Detroit, in the county of Wayne and State of Michigan, have invented certain new and useful Improvements in Devices for Preventing Liquid from Freezing in Tanks, of which the following is a specification.

This invention relates to devices for preventing water from freezing in tanks, reservoirs, or receptacles, and it has for one of its objects the provision of a device which may be attached to the bottom of, or below, such tank and which permits the water or other liquid to drain therefrom when the temperature falls to a point where said liquid would ordinarily freeze and consequently be apt to burst or otherwise damage the tank.
The invention has, furthermore, for its object the provision of such a device which comprises as one of its elements a small chamber in communication with the main chamber of the device, which small chamber is exposed in which might be termed "an isolated manner" so as to be more readily affected by the condition of the atmosphere or temperature.

The invention has also for its object the provision of means whereby the condition of some of the movable parts of the device may be indicated at a point remote from the tank, or from the device, as may be most expedient and desired.
Further objects of the invention will hereinafter appear and be particularly defined in the claims.

The invention has been clearly illustrated in the accompanying drawings, in which—
Figure 1 is a front view of a device for the purpose named, embodying my invention. Fig. 2 is a central vertical section thereof, and Fig. 3 is a rear view thereof. Fig. 4 illustrates a modification.
Briefly stated, the present invention constitutes an attachment in which a small body of water or other liquid is isolated from a larger body of such liquid in such a manner that the atmosphere may be enabled to affect the small body very quickly. This refers more particularly to the temperature so that when the smaller body of liquid freezes, as it will on account of its small volume and large exposure, the expansion of the ice formed in the small chamber will force open a valve, so that now the contents of the tank or other receptacle may run out, and consequently all damage, as bursting of pipes, or of the tank itself, will be avoided.

The present device may be applied in many different ways, and to tanks of various species; but the fundamental idea underlying its particular purpose is that of connecting the device with that of a radiator for cooling the explosive engine of an automobile. During severe winter weather it has often been found that the cooling fluid in the radiator will freeze and therefore be apt to cause damage to the pipes or their joints, notwithstanding the fact that the water may be warm and remain thus for a space of time after the engine has stopped running.

Referring to the drawings, 10 denotes a casing provided at its upper end with an inlet nipple 11 and having near the lower portion thereof an outlet conduit 12 which is normally closed by a valve 13 held against its seat by a spring 14. Access may be had to the interior of the casing through a plug 15 which serves also as an abutment against which one end of the spring 14 rests. A stop cock 16 is rotatable in an extension 16' of the casing 10 and may connect the interior of the latter with the conduit 12 for the purpose of drawing off the contents of the casing, without necessitating their passage past the valve 13.

The upper nipple 11 may be connected in any suitable manner to a tank, reservoir, or receptacle, communication between them being normally constant so that when either the valve 13, or the stop cock 16, or both, are open, the contents of the tank will have a free exit through the conduit 12, as will be readily understood.

In order to expose a small quantity of the liquid directly to the atmosphere, or, more particularly speaking, to the influence of the temperature, the casing 10 has a depression in its front face thus confining a comparatively small volume of liquid between the front wall 17 and the back of the casing. In fact a freezing chamber 18 is formed in the casing, and is in constant communication with the interior of the main chamber, by ducts 19, 20. The rear part of the chamber 18 is closed by a diaphragm 21 which preferably is secured to the back plate of the casing by a ring 22 held in position by a series of cap screws 22', the construction being such as to make a watertight seal between the diaphragm and the rear wall rim of the freezing chamber 18. It will now be seen that the liquid contained in a tank disposed above the casing 10, will not only fill the latter, but it will also fill the chamber 18 and the ducts 19, 20, and, in order to permit the atmosphere to reach substantially all parts of the inclosing walls of the freezing chamber 18, the wall 17 and the diaphragm 21 may be provided with a series of perforations 23 so that an air current coming from either the front or the rear of the casing, may have an opportunity of playing over and around the walls of the freezing chamber and also around the conduits 19, 20. Inasmuch as the volume of liquid in the latter is comparatively small, it follows that the liquid will freeze in these ducts first, thus confining the liquid in the freezing chamber 18 and isolating the same against radiation or transfer of heat from the liquid contained in the main casing body.

In the present instance I take advantage of the physical properties of liquid, namely: that when a liquid freezes sufficiently to form a body of ice, it will expand under very great pressure so that in the present instance this pressure will manifest itself upon the diaphragm 21 which will be forced outwardly thereby, and thus open the valve 13 to permit the contents of the casing 10 and, in fact, the tank connected, to escape.

While it is evident that many different mechanisms may be employed between the diaphragm 21 and the valve 13 to accomplish the desired results, I have illustrated an angle lever 24 pivoted at 25, and the outer end of one of its arms has an abutment screw 27 which may be adjusted as close as desired and then held in such adjusted position by a check nut 27'.

The valve 13 has a stem 28 extending through the rear wall of the conduit 12, and adapted to be forcibly engaged and driven inwardly to open said valve by a lever 29 pivoted at 30 on the wall of said casing conduit. This lever extends upwardly and has an aperture 29' whereby it straddles the rearwardly extending arm 24' of the angle lever or arm 24 above mentioned, this arm serving as a trip catch which normally holds the lever 29 in the position shown in Fig. 2, and which will, when released, permit said lever 29 to be quickly swung toward the front of the casing by a spring 31 attached to a rearward extension 29'' of the lever 29 and to an arm 24'' of the angle lever 24. It should be noted that the spring 30 is strong enough to overpower the valve spring 14 above mentioned.

From the foregoing it will be understood that when the body of liquid in the freezing chamber 18 freezes it will force the diaphragm outwardly, thus moving the angle lever 24 to unlatch the main lever 29 so that now the spring 31 will become effective in moving the valve 13 to open the latter sufficiently to permit the escape of the liquid contained in the casing and the tank connected therewith, so that consequently no damage can result other than that of the necessity of refilling the tank.

In some instances it is very desirable that due notice of the operation of the device, or of some of its elements be given at a point remote from the device, and in the present instance I have provided what may be termed a "double" indication which pertains to the trip lever, and also to the main lever, the different indications being successive in operation and complemental to each other.

Referring to Fig. 2 it will be noted that the upper end of the main lever 29 pivotally supports a groove pulley over which a cord 33 passes and connects with the outer end of the trip arm 24'; while its other end may be connected to a lever 34 pivoted on a fixed axis 35 and carrying a pointer 36 coöperative with index marks as shown. The latter are so arranged that when the trip lever 24' has been forced down by the outward movement of the diaphragm sufficiently to release the main lever 29, the pointer will be at Station I. If the mechanism is in proper working order the lever 29 should then immediately become operative upon the valve 13, therefore moving the pulley 23 toward the rear end of the casing, and thus swinging the arm 34 until the pointer 36 has arrived at Station II. This means that the actual condition of the mechanism is always directly indicated either singly or collectively, a feature which is important because it will also indicate any accidental displacement of either of the levers and the parts operated thereby. The spring 30 answers in the present instance for the double purpose of throwing the trip lever into engagement with the main lever, and also for swinging the latter inwardly to open the valve, and it will only be necessary, when resetting the device, to exert a rearward pressure on the extreme upper end of the lever 29 until the parts will automatically snap together into their set positions.

Many changes may be made in the particular construction in the general organization of the mechanism and its component elements without departing from the spirit of the invention, as for instance in the manner of securing the diaphragm, which may be accomplished by the construction shown in Fig. 4, in which the diaphragm 210 is seated within a recess in the rear face of the casing, the edges 210' of the casing being swaged or spun-over the margin of the diaphragm, thus forming a tight joint all around the marginal edge of the same.

I claim:—

1. A device for the purpose named, comprising a casing having an inlet and an outlet opening, a chamber within the main chamber of the casing above said outlet opening and communicating with the interior of the main chamber, a valve in the outlet below the first mentioned chamber normally closed, and means for opening said valve by the formation of ice in said chamber.

2. A device for the purpose named, comprising a casing having an inlet and an outlet opening, a chamber within the main chamber of the casing above said outlet opening and communicating with the interior of the main chamber, a valve in the outlet below the first mentioned chamber, and a lever connected with said valve and operable upon the formation of ice in said chamber.

3. A device for the purpose named, comprising a casing having an inlet and an outlet opening, a chamber within the main chamber of the casing above said outlet opening and communicating with the interior of the main chamber, a valve in the outlet below the first mentioned chamber normally closed, a lever pivoted on the casing, resilient means for moving said lever to open said valve, means for normally holding said lever against operation by said resilient means, and a diaphragm in one wall of the first mentioned chamber and movable by the formation of ice therein to release said lever from the holding means.

4. A device for the purpose named, comprising a casing having an inlet and an outlet opening, a chamber within the main chamber of the casing above said outlet opening and communicating with the interior of the main chamber, a valve in the outlet below the first mentioned chamber normally closed, a lever pivoted on the casing, resilient means for moving said lever to open said valve, a trip lever for normally holding said lever against operation by said resilient means, and a diaphragm closing one side of said first-mentioned chamber and movable by the formation of ice therein, to release said lever from the holding means.

5. A device for the purpose named, comprising a casing having an inlet and an outlet opening, a chamber within the main chamber of the casing above said outlet opening and communicating with the interior of the main chamber, a valve in the outlet below the first mentioned chamber normally closed, a lever for opening said valve, a trip lever normally holding the valve-lever against operation, a diaphragm inclosing one side of said first-mentioned chamber, and a spring for operating said valve lever to open the valve and also for normally holding the trip lever against the valve lever to prevent its operation, said trip lever being operative to release the valve lever therefrom by the formation of ice in said first-mentioned chamber.

6. A device for the purpose named, comprising a casing having an inlet and an outlet opening, a chamber within the main chamber of the casing above said outlet opening and communicating with the interior of the main chamber, a valve in the outlet below the first mentioned chamber normally closed, a lever for opening said valve, a trip lever normally holding said lever against operation, a diaphragm inclosing one side of said first-mentioned chamber, and a spring for operating said valve lever to open the valve and also for normally holding the trip lever against the valve lever to prevent its operation, said trip lever being operative to release the valve lever therefrom by the formation of ice in said first-mentioned chamber, and means for indicating the position of the valve lever at a point remote from said device.

7. A device for the purpose named, comprising a casing having an inlet and an outlet opening, a chamber within the main chamber of the casing above said outlet opening and communicating with the interior of the main chamber, a valve in the outlet below the first mentioned chamber normally closed, a lever for opening said valve, a trip lever normally holding said lever against operation, a diaphragm inclosing one side of said first-mentioned chamber, and a spring for operating said valve lever to open the valve and also for normally holding the trip lever against the valve lever to prevent its operation, said trip lever being operative to release the valve lever therefrom by the formation of ice in said first-mentioned chamber, and means for indicating the position of the trip lever at a point remote from said device.

8. A device for the purpose named, comprising a casing having an inlet and an outlet opening, a chamber within the main chamber of the casing above said outlet opening and communicating with the interior of the main chamber, a valve in the outlet below the first mentioned chamber normally closed, a lever for opening said valve, a trip lever normally holding said lever against operation, a diaphragm inclosing one side of said first-mentioned chamber, and a spring for operating said valve lever to open the valve and also for normally holding the trip lever against the valve lever to prevent its operation, said trip lever being operative to release the valve lever therefrom by the formation of ice in said first-mentioned chamber, and means for successively indicating the positions of said trip lever and said valve lever, respectively, at a point remote from said device.

In testimony whereof I affix my signature in presence of two witnesses.

WILFRED O. CHASE.

Witnesses:
　CHAS. F. SCHMELZ,
　EDITH FITZGIBBON.